(12) United States Patent
Shin et al.

(10) Patent No.: US 12,123,612 B2
(45) Date of Patent: Oct. 22, 2024

(54) AIR CONDITIONER WITH MULTIPLE SETTING PATTERN OPERATION

(71) Applicant: Samsung Electronics Co., Ltd., Suwon-si (KR)

(72) Inventors: Dongjun Shin, Suwon-si (KR); Kyungjae Kim, Suwon-si (KR); Jooyoo Kim, Suwon-si (KR); Tan Kim, Suwon-si (KR); Hyungseon Song, Suwon-si (KR); Seolhee Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 562 days.

(21) Appl. No.: 17/427,042

(22) PCT Filed: Jul. 27, 2021

(86) PCT No.: PCT/KR2021/009738
§ 371 (c)(1),
(2) Date: Jul. 29, 2021

(87) PCT Pub. No.: WO2022/025597
PCT Pub. Date: Feb. 3, 2022

(65) Prior Publication Data
US 2022/0196275 A1    Jun. 23, 2022

(30) Foreign Application Priority Data

Jul. 29, 2020    (KR) .................. 10-2020-0094435

(51) Int. Cl.
*F24F 11/63*    (2018.01)
*G05B 19/042*    (2006.01)

(52) U.S. Cl.
CPC ............ *F24F 11/63* (2018.01); *G05B 19/042* (2013.01); *G05B 2219/2614* (2013.01)

(58) Field of Classification Search
CPC ........ F24F 11/63; F24F 11/64; F24F 2120/10; F24F 11/52; F24F 11/56; F24F 2110/10;
(Continued)

(56) References Cited

U.S. PATENT DOCUMENTS

| 7,150,157 B2 | 12/2006 | Jurthe |
| 7,246,499 B2 | 7/2007 | Pham et al. |

(Continued)

FOREIGN PATENT DOCUMENTS

| JP | 2011137589 A | 7/2011 |
| JP | 6308466 B2 | 4/2018 |

(Continued)

OTHER PUBLICATIONS

International Search Report and Written Opinion of the International Searching Authority dated Nov. 10, 2021, in connection with International Application No. PCT/KR2021/009738, 17 pages.

*Primary Examiner* — Rami R Okasha

(57) ABSTRACT

Disclosed are an air conditioner, an air conditioning system, and a control method thereof. The air conditioner includes an input interface, a communication interface configured to communicate with a server, and a processor configured to receive a main setting pattern from the server and operate according to the received main setting pattern, based on a setting value changing, transmit the changed setting value and first environment information at the time when the setting value is changed to the server, based on receiving a selection of an artificial intelligence control operation from a user, transmit current second environment information to the server, control the communication interface to receive the main setting pattern or a sub-setting pattern corresponding to the changed setting value from the server based on the first environment information and the second environment
(Continued)

information, and operate according to the received main setting pattern or the received sub-setting pattern.

12 Claims, 14 Drawing Sheets

(58) Field of Classification Search
CPC .............. F24F 2110/20; G05B 19/042; G05B 2219/2614; H04L 65/40; H04L 67/125; G06N 20/00; G06N 3/02; G06N 3/08
See application file for complete search history.

(56) References Cited

U.S. PATENT DOCUMENTS

| | | |
|---|---|---|
| 10,941,950 B2 | 3/2021 | Takeuchi et al. |
| 10,970,128 B2 | 4/2021 | Song et al. |
| 11,137,161 B2 | 10/2021 | Ock et al. |
| 2008/0191045 A1 | 8/2008 | Harter |
| 2018/0266718 A1* | 9/2018 | Gillette .................... F24F 11/64 |
| 2018/0283723 A1* | 10/2018 | Ock ....................... G05B 15/02 |
| 2019/0242608 A1 | 8/2019 | Laftchiev et al. |
| 2021/0025613 A1* | 1/2021 | Knatchbull-Hugessen ................. F24F 11/47 |
| 2021/0215370 A1 | 7/2021 | Moon et al. |
| 2022/0018567 A1 | 1/2022 | Ock et al. |

FOREIGN PATENT DOCUMENTS

| | | | |
|---|---|---|---|
| JP | 2018-078428 A | 5/2018 | |
| JP | 6659603 B2 | 3/2020 | |
| KR | 10-1997-0047360 A | 7/1997 | |
| KR | 10-1862743 B1 | 5/2018 | |
| KR | 10-2018-0112653 A | 10/2018 | |
| KR | 10-2019-0096878 A | 8/2019 | |
| KR | 10-2077175 B1 | 2/2020 | |

* cited by examiner

FIG. 7

| MAIN SETTING PATTERN | SUB-SETTING PATTERN |
|---|---|
| ROOM TEMPERATURE: 30 DEGREES<br>P.M.: 1 O'CLOCK<br>SETTING TEMPERATURE: 26 DEGREES<br>OPERATION MODE: COOLING | ROOM TEMPERATURE: 30 DEGREES<br>P.M.: 1 O'CLOCK<br>SETTING TEMPERATURE: 24 DEGREES<br>OPERATION MODE: COOLING |

FIG. 9

```
┌─────────────────────────────────┐
│      MAIN SETTING PATTERN       │
│                                 │
│ ROOM TEMPERATURE: 30 DEGREES    │
│ P.M.: 1 O'CLOCK                 │
│ SETTING TEMPERATURE: 26 DEGREES │
│ OPERATION MODE: COOLING         │
└─────────────────────────────────┘
┌─────────────────────────────────┐┌─────────────────────────────────┐
│    FIRST SUB-SETTING PATTERN    ││   SECOND SUB-SETTING PATTERN    │
│                                 ││                                 │
│ USER: HUSBAND                   ││ USER: WIFE                      │
│ ROOM TEMPERATURE: 30 DEGREES    ││ ROOM TEMPERATURE: 30 DEGREES    │
│ P.M.: 1 O'CLOCK                 ││ P.M.: 1 O'CLOCK                 │
│ SETTING TEMPERATURE: 24 DEGREES ││ SETTING TEMPERATURE: 28 DEGREES │
│ OPERATION MODE: COOLING         ││ OPERATION MODE: COOLING         │
└─────────────────────────────────┘└─────────────────────────────────┘
```

AIR CONDITIONER WITH MULTIPLE SETTING PATTERN OPERATION

CROSS-REFERENCE TO RELATED APPLICATIONS

This application is a 371 National Stage of International Application No. PCT/KR2021/009738 filed Jul. 27, 2021, which claims priority to Korean Patent Application No. 10-2020-0094435 filed Jul. 29, 2020, the disclosures of which are herein incorporated by reference in their entirety.

BACKGROUND

1. Field

The disclosure relates to an air conditioner, an air conditioning system, and a control method thereof, and more particularly relates to an air conditioner which performs an operation based on a surrounding environment and feedback setting information of a user, an air conditioning system, and a control method thereof.

2. Description of Related Art

An air conditioner is a device which adjusts a room temperature or humidity. The early air conditioners operated according to conditions set by a user. However, users were not sufficiently satisfied with the early air conditioners, since conditions of comfortability vary depending on surrounding environments or users.

In order to solve such a problem, a technology of controlling an air conditioner based on predicted mean vote (PMV) is developed. The PMV control is a method for controlling an air conditioner by setting conditions for an average comfort for users, by generally considering environment information, information of users, and the like. The air conditioner may be controlled under the conditions in which the user can feel more comfortable through the PMV-based control.

However, the condition of the comfortability may vary for each user even in the same environment conditions. For example, in the same environment conditions, a first user may feel comfortable when an operation temperature of the air conditioner is set to 26 degrees, and a second user may feel comfortable when the operation temperature of the air conditioner is set to 24 degrees. The PMV-based control operates the air conditioner based on the average condition, and accordingly, there is a limit in controlling the air conditioner to the collective comfort of all users.

Therefore, there is a necessity to provide a technology of controlling operations of the air conditioner so as to improve collective comfort of all users.

SUMMARY

The disclosure is made to solve the above problems, and an object of the disclosure is to provide an air conditioner that operates so that each user feels comfortability, an air conditioning system, and a control method thereof.

In accordance with an aspect of the disclosure, there is provided an air conditioner including an input interface, a communication interface configured to communicate with a server, and a processor configured to receive, from the server, a main setting pattern including a plurality of setting values, with which a machine learning model is trained, and operate according to the received main setting pattern; based on a setting value among the plurality of setting values changing via the input interface, transmit the changed setting value and first environment information at a time when the setting value is changed to the server, based on receiving a selection of an artificial intelligence control operation from a user, transmit current second environment information to the server, control the communication interface to receive the main setting pattern or a sub-setting pattern corresponding to the changed setting value from the server based on the first environment information and the second environment information, and operate according to the received main setting pattern or the received sub-setting pattern.

The processor may be configured to control the communication interface to, based on a similarity between the first environment information and the second environment information being equal to or more than a predetermined value, receive the sub-setting pattern from the server, and based on the similarity between the first environment information and the second environment information being less than the predetermined value, receive the main setting pattern from the server.

The sub-setting pattern may be generated individually according to a user present in a room through training of the machine learning model based on information indicating whether the user is present in the room.

The air conditioner may further include a memory, the processor may be configured to store identification information of a terminal device of the user in the memory, control the communication interface to, based on the setting value changing, receive identification information and location information of the terminal device, confirm the user based on the stored identification information and the received identification information, confirm whether the confirmed user is present in the room based on the received location information, and control the communication interface to transmit the information indicating whether the confirmed user is present in the room to the server.

The sub-setting pattern may be generated by applying a weight to at least one piece of information of a room temperature, a time, or a time during which an air conditioning operation is performed.

The environment information may include at least one of a room temperature, humidity, weather, date, day, time, a number of times of operation, an operation time during one operation, a present state of a user, or information on a user located in a room.

In accordance with another aspect of the disclosure, there is provided a method for controlling an air conditioner, the method including receiving a main setting pattern including a plurality of setting values, with which a machine learning model is trained, operating according to the received main setting pattern, based on a setting value among the plurality of setting values changing, transmitting the changed setting value and first environment information at the time when the setting value is changed, based on receiving a selection of an artificial intelligence control operation from a user, transmitting second environment information, receiving the main setting pattern or a sub-setting pattern corresponding to the changed setting value based on the first environment information and the second environment information, and operating according to the received main setting pattern or the received sub-setting pattern.

The receiving of the main setting pattern or the sub-setting pattern corresponding to the changed setting value may include, based on a similarity between the first environment information and the second environment information being equal to or more than a predetermined value, receiving the sub-setting pattern, and based on the similarity between the first environment information and the second environment information being less than the predetermined value, receiving the main setting pattern.

The sub-setting pattern may be generated individually according to a user present in a room through training of the machine learning model based on information indicating whether the user is present in the room.

The method for controlling an air conditioner may further include storing identification information of a terminal device of the user, based on the setting value changing, receiving identification information and location information of the terminal device, confirming the user based on the stored identification information and the received identification information and confirming whether the confirmed user is present in the room based on the received location information, and transmitting the information indicating whether the confirmed user is present in the room.

The sub-setting pattern may be generated by applying a weight to at least one piece of information of a room temperature, a time, or a time during which an air conditioning operation is performed.

The environment information may include at least one of a room temperature, humidity, weather, date, day, time, a number of times of operation, an operation time during one operation, a present state of a user, or information on a user located in a room.

In accordance with still another aspect of the disclosure, there is provided an air conditioning system including an air conditioner and a server, the system including the server configured to transmit a main setting pattern including a plurality of setting values, with which a machine learning model is trained, to the air conditioner, and the air conditioner configured to operate according to the received main setting pattern, in which the air conditioner is configured to, based on at least one setting value among the plurality of setting values changing, transmit the changed setting value and first environment information at the time when the setting value is changed to the server via the input interface, and based on receiving a selection of an artificial intelligence control operation from a user, transmit current second environment information to the server, in which the server is configured to transmit the main setting pattern or a sub-setting pattern corresponding to the changed setting value to the air conditioner based on the first environment information and the second environment information, and the air conditioner is configured to operate according to the received main setting pattern or the sub-setting pattern.

The server may be configured to generate the sub-setting pattern separate from the main setting pattern through the machine learning model based on the changed setting value and the first environment information received from the air conditioner.

The server may be configured to calculate a similarity between the first environment information and the second environment information, based on the similarity being equal to or more than a predetermined value, transmit the sub-setting pattern to the air conditioner, and based on the similarity being less than the predetermined value, transmit the main setting pattern to the air conditioner.

The server may generate the sub-setting pattern individually according to a user present in a room through training of the machine learning model based on information indicating whether the user is present in the room.

The air conditioner may confirm whether the room is present in the room based on at least one of location information of a terminal device of the user, identification information of the user, and information on the user received from a door lock sensor.

The air conditioner may configured to, based on confirmation whether the user is present in the room based on terminal location information of the user, store identification information of the terminal device of the user, based on the setting value changing, receive identification information and location information of the terminal device, confirm the user based on the stored identification information and the received identification information, confirm whether the confirmed user is present in the room based on the received location information, and transmit the confirmed information indicating whether the user is present in the room to the server.

The server may generate the sub-setting pattern by applying a weight to at least one piece of information of a room temperature, a time, or a time during which an air conditioning operation is performed.

The environment information may include at least one of a room temperature, humidity, weather, date, day, time, a number of times of operation, an operation time during one operation, a present state of a user, or information on a user located in a room.

According to various aspects of the disclosure, the air conditioner, the air conditioning system, and the control method thereof may control operations under various conditions according to each user.

The effects of the disclosure are not limited to the effects described above and other effects not mentioned above may be clearly understood by those skilled in the art of the disclosure from the description below.

BRIEF DESCRIPTION OF THE DRAWINGS

FIG. 7 is a diagram illustrating a setting pattern according to an embodiment;

FIG. 9 is a diagram illustrating setting patterns according to users according to an embodiment;

DETAILED DESCRIPTION

Figure 1:
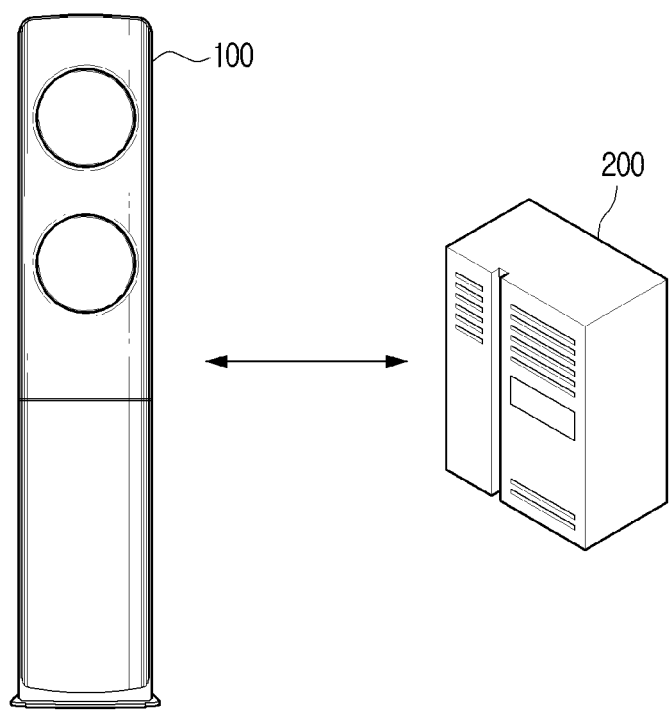
FIG. 1 is a diagram illustrating an air conditioning system according to an embodiment.

Hereinafter, various embodiments will be described in more detail with reference to the accompanying drawings.

The embodiments in this specification may be variously modified. A specific embodiment may be illustrated in the drawing and described in detail in the detailed description. However, the specific embodiment disclosed in the accompanying drawing is merely for easy understanding of various embodiments. Accordingly, it should be understood that the technical spirit is not limited to the specific embodiment disclosed in the accompanying drawing, and all equivalents or alternatives included in the disclosed spirit and technical scope are included.

The terms including ordinals such as "first" or "second" may be used for describing various components, but the components are not limited by the above terms. The above terms may be only used for distinguishing one component from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. If it is described that a certain element is "connected to" or "coupled to" another element, it should be understood that the certain element may be connected to the other element directly or through still another element. On the other hand, if it is described that a certain element is "directly coupled to" or "directly connected to" another element, it may be understood that there is no element therebetween.

Meanwhile, a "module" or a "unit" regarding an element used in the disclosure may perform at least one function or operation. In addition, the "module" or the "unit" may perform the function or the operation by hardware, software, or a combination of hardware and software. In addition, a plurality of "modules" or a plurality of "units", except for a "module" or a "unit" which should be performed in specific hardware or performed in at least one processor, may be integrated into one module. Unless otherwise defined specifically, a singular expression may encompass a plural expression.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps. In the specification, "A or B" does not only selectively indicate any one of A and B, but is defined to include both A and B. In addition, a term "including" in the disclosure may have meaning of further including other elements, in addition to the listed elements.

In the specification, compulsory elements necessary for the description of the disclosure are only described and elements with no relation with the gist of the disclosure may not be mentioned. It should not be interpreted as exclusive meaning of including only the mentioned elements, but should be interpreted as non-exclusive meaning of including other elements.

In addition, in describing the disclosure, a detailed description of the related art or configuration may be omitted when it is determined that the detailed description may unnecessarily obscure a gist of the disclosure. Meanwhile, each embodiment may be implemented or operated independently or the embodiment may also be implemented or operated in combination.

FIG. 1 is a diagram illustrating an air conditioning system according to an embodiment.

Referring to FIG. 1, an air conditioning system may include an air conditioner 100 and a server 200.

The air conditioner 100 may be operated by a manual control method or an artificial intelligence (AI) control method. For example, the manual control method may be a method for performing an operation according to a setting value set by a user. In an embodiment, if the user sets a mode to a cooling mode, a setting temperature to 24 degrees, and a wind volume to middle, the air conditioner 100 may perform an operation based on the setting values set by the user. The AI control method may be a method for training a machine learning model based on setting values set by the user in the past, and performing an operation according to a setting pattern including the setting values calculated by using the trained machine learning model. For example, the setting values may include an operation mode (e.g., cooling mode, dehumidification mode, or the like), a setting temperature, a setting time, a wind volume, a wind direction, a wind speed, and the like. Data for training the machine learning model may include environment information except for the past setting values of the user. For example, the environment information may include a room temperature, humidity, weather, date, day, time, a number of times of operation, an operation time during one operation, a present state of a user, information of a user located in a room, and the like. In this specification, a setting pattern provided in the general AI control method is referred to as a main setting pattern. In other words, the main setting pattern may refer to an operation pattern including various setting values set by the user, or a plurality of setting values used to train the machine learning model along with the environment information.

Meanwhile, the air conditioner 100 may perform an operation according to a setting pattern that is different from the main setting pattern by reflecting a feedback of the user when operating by the AI control method. In this specification, the setting pattern obtained by reflecting the feedback of the user is referred to as a sub-setting pattern. In other words, the sub-setting pattern may refer to an operation pattern including a plurality of setting values used to train the machine learning model based on various setting values including setting values changed by the user and environment information at the time of changing the setting values.

In the general AI control method, it is possible to provide a more comfortable environment to the user, since the air conditioner 100 is controlled by using the machine learning model trained based on the setting values of the user and the environment information. However, the general AI control method has a limit in providing a sufficiently comfortable environment according to a momentary (or temporary) change of the environment condition or a user's request. Accordingly, the air conditioner 100 may operate by reflecting the feedback of the user when operating by the AI control method, thereby rapidly responding to the momentary (or temporary) change of the environment condition or the user's request.

The air conditioner 100 may operate by the general AI control method according to selection of the user. In other words, the air conditioner 100 may receive the main setting pattern from the server 200 and operate based on the received main setting pattern. The user may not be satisfied with the setting values of the air conditioner 100 operating in the main setting pattern. The user may change at least one setting value of the setting values included in the main setting pattern. The air conditioner 100 may transmit the changed setting value and first environment information at the time when the setting value is changed to the server 200.

The server 200 may generate the sub-setting pattern based on the changed setting value and the first environment information.

The air conditioner 100 may receive a command for setting the AI control method from the user later. At that time, the air conditioner 100 may transmit current second environment information to the server 200. The air conditioner 100 may receive the main setting pattern or the sub-setting pattern from the server 200 according to the conditions and perform the operation according to the received setting pattern.

The server 200 may train the machine learning model based on the setting values set by the user. In an embodiment, the server 200 may be associated with an AI cloud. The AI cloud may be located outside of the server 200 and perform some operations related to the machine learning model, and it is assumed that the server 200 is a main agent and the AI cloud is subordinate to the server 200. In other words, the AI cloud may operate in the same concept as one configuration included in the server 200. Accordingly, when the server 200 is associated with the AI cloud, it is assumed that the server 200 performs the operation related to the machine learning model by using the AI cloud as one module.

Alternatively, the AI cloud may be a separate device from the server 200. In this case, the server 200 may receive setting values from the air conditioner 100 and transmit the received setting values to the AI cloud. The AI cloud may train the machine learning model based on the setting values and generate the main setting pattern by using the trained machine learning model. When the air conditioner 100 operates by the general AI control method, the air conditioner 100 may receive the generated main setting pattern via the server 200 and operate based on the main setting pattern.

Alternatively, the server 200 may receive the setting values from the air conditioner 100, train the machine learning model based on the received setting values, and generate the main setting pattern by using the trained machine learning model.

As described above, the user may change at least one setting value among the setting values included in the main setting pattern. The server 200 may receive the changed setting value and the first environment information at the time when the setting value is changed from the air conditioner 100. The server 200 may generate the sub-setting pattern by using the machine learning model based on the changed setting value and the first environment information. In an embodiment, the server 200 may train the machine learning model by applying weights to information such as a room temperature, a time during which an air conditioning operation is performed, a manipulation time, and the like. In other words, the server 200 may generate the sub-setting pattern by applying the weights to the information described above. Meanwhile, the sub-setting pattern may be generated individually according to the user. An embodiment in which the sub-setting pattern is generated individually according to the user will be described below.

If the air conditioner 100 receives a command for selecting the AI control method from the user after the sub-setting pattern is generated, the current second environment information may be transmitted to the server 200. The server 200 may calculate a similarity between the first environment information at the time of generating the sub-setting pattern and the current second environment information by using the machine learning model. If the calculated similarity is equal to or more than a predetermined value, the server 200 may transmit the sub-setting pattern to the air conditioner 100. In other words, if the calculated similarity is equal to or more than a predetermined value, it may imply that the current environment information is similar to the environment information at the time when the user changes the setting. Accordingly, the user may feel more comfortable, when the air conditioner 100 operates in the sub-setting pattern including the changed setting value.

Alternatively, if the calculated similarity is less than the predetermined value, the server 200 may transmit the main setting pattern to the air conditioner 100. In other words, if the calculated similarity is less than the predetermined value, it may imply that the current environment information is not similar to the environment information at the time when the user changes the setting. Accordingly, the user may feel more comfortable, when the air conditioner 100 operates in the main setting pattern.

The air conditioner 100 may perform the operation according to the main setting pattern or the sub-setting pattern received from the server 200. Therefore, the air conditioner and the air conditioning system of the disclosure may control the operation of the air conditioner 100 by reflecting the feedback of the user to rapidly provide comfortable environment to the user.

Hereinafter, the configurations of the air conditioner 100 and the server 200 will be described.

Figure 2:
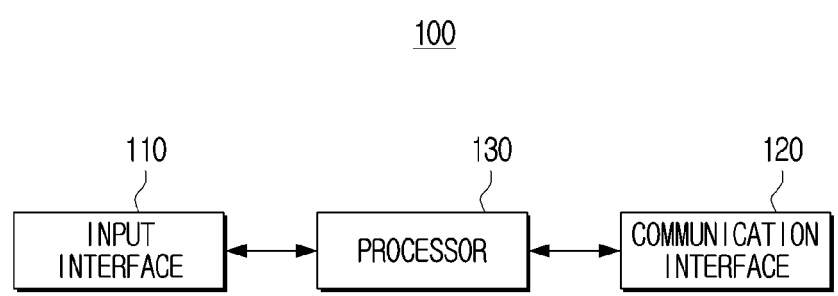
FIG. 2 is a block diagram illustrating a configuration of an air conditioner according to an embodiment.
Figure 3:
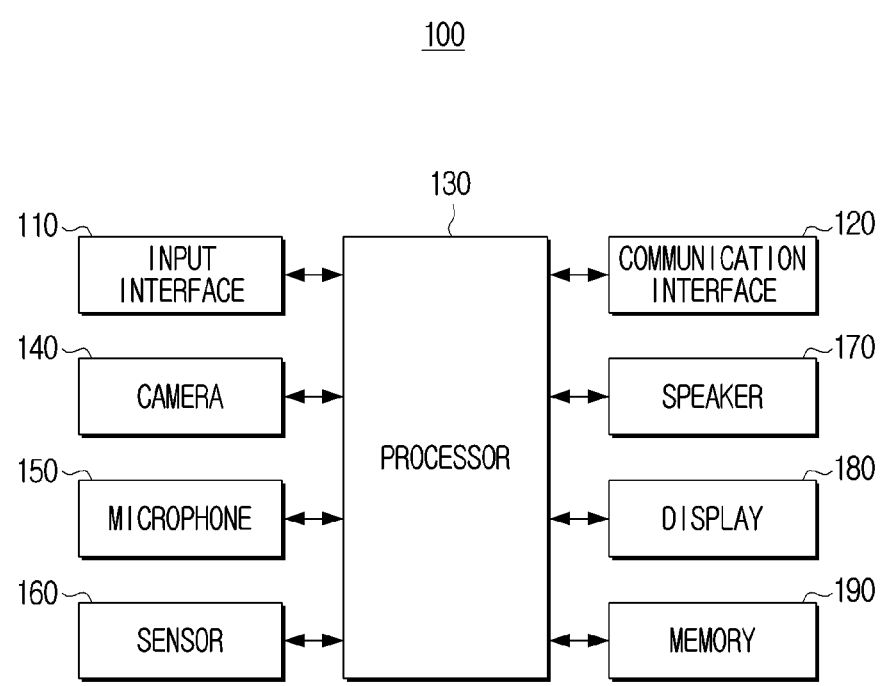
FIG. 3 is a block diagram illustrating a specific configuration of the air conditioner according to an embodiment.

FIG. 2 is a block diagram illustrating a configuration of the air conditioner according to an embodiment and FIG. 3 is a block diagram illustrating a specific configuration of the air conditioner according to an embodiment. The description will be made with reference to FIGS. 2 and 3.

Referring to FIG. 2, the air conditioner 100 may include an input interface 110, a communication interface 120, and a processor 130.

The input interface 110 may receive the operation method of the air conditioner 100, various setting values, changed values of the setting values, and the like from the user. For example, the input interface 110 may be implemented as a keypad, a touch pad, or the like. The input interface 110 may perform a function of receiving a command from the user and may be referred to as an inputter, an input module, or the like.

The communication interface 120 may transmit and receive data (or information) with the server 200. For example, the communication interface 120 may include a data network communication module of LTE, Wi-Fi, Bluetooth, or the like, and may communicate with the server 200 through a short distance communication network and the Internet. The communication interface 120 may transmit the setting values of the user, the changed setting values, the environment information when changing the setting values, the environment information when selecting the AI control method, and the like to the server 200. The communication interface 120 may receive the main setting pattern or the sub-setting pattern from the server 200.

The communication interface 120 may communicate with a user terminal device (not illustrated). The communication interface 120 may receive identification information and location information from the user terminal device. The processor 130 may identify the user based on the identification information and the location information of the user terminal device and confirm a present state of the user. The communication interface 120 may communicate with an IoT device (not illustrated). For example, if the IoT device is a door lock which determines to open or not by recognizing the user, the communication interface 120 may receive identification information and room entering information of the user from the door lock. The processor 130 may identify the user based on the identification information and the door entering information of the user and confirm the present state of the user. The communication interface 120 may communicate with the server 200 and may be referred to as a communicator, a communication module, a transceiver, or the like.

The processor 130 may control each configuration of the air conditioner 100. For example, the processor 130 may control the input interface 110 to receive a command from the user, and control the communication interface 120 to transmit and receive the data with the server 200. The processor 130 may transmit the setting values set by the user, the environment information, the changed setting values when the setting values are changed, and environment information when the setting values are changed to the server 200 via the communication interface 120. When the AI control method is selected, the processor 130 may transmit the environment information when the AI control method is selected to the server 200 via the communication interface 120. The processor 130 may perform the air conditioning operation by setting a setting item based on the received main setting pattern or sub-setting pattern.

Meanwhile, the air conditioner 100 may further include a configuration other than the configuration described above.

Referring to FIG. 3, the air conditioner 100 may include the input interface 110, the communication interface 120, the processor 130, a camera 140, a microphone 150, a sensor 160, a speaker 170, a display 180, and a memory 190.

Meanwhile, the input interface 110 may be implemented as the camera 140, the microphone 150, the sensor 160, or the display 180 in addition to the keypad or the touch pad described above. For example, when the input interface 110 is implemented as the camera 140, the air conditioner 100 may capture face or operations of the user. The processor 130 may recognize a command of the user based on the captured face or operation. When the input interface 110 is implemented as the microphone 150, the air conditioner 100 may receive a user's voice. The processor 130 may recognize the command of the user based on the input voice. When the input interface 110 is implemented as the sensor 160, the sensor 160 may receive a signal of a remote control, an operation signal of the user, and the like. The processor 130 may recognize the command of the user based on the input signal. In addition, when the display 180 is implemented as a touch screen, the air conditioner 100 may receive the command of the user through the touch screen.

The camera 140 may capture an image including the user. The processor 130 may identify the user based on the captured image and confirm the present state of the user. The microphone 150 may receive the user's voice. The processor 130 may identify the user by analyzing the user's voice and confirm the present state of the user.

The sensor 160 may detect surrounding environment information where the air conditioner 100 is located. For example, the sensor 160 may include a thermometer, a hygrometer, a barometer, a heat detection sensor, a proximity sensor, a motion sensor, an infrared sensor, an ultrasonic sensor, a biometric information recognition sensor, and the like.

The speaker 170 may output an audio signal. The speaker 170 may output an input command of the user, a state related information or operation related information of the air conditioner 100, and the like as a voice or a notification sound.

The display 180 may output an input command of the user, a state related information or operation related information of the air conditioner 100, and the like as a text or an image. For example, the display 180 may be implemented as a liquid crystal display (LCD), an organic light emitting diode (OLED), a flexible display, or a touch screen.

The memory 190 may store data or the like for performing the function of the air conditioner 100 and store a program, an instruction, or the like operated in the air conditioner 100. As described above, the training of the machine learning model and the generation of the setting patterns may be performed on the server 200 or the AI cloud. However, depending on cases, the air conditioner 100 may include the machine learning model and perform a process of training of the machine learning model and generating the setting patterns. In an embodiment, the memory 190 may store a machine learning model. The machine learning model stored in the memory 190 may be transferred to the processor 130 by the control of the processor 130. The processor 130 may train the machine learning model and generate the setting patterns by using the trained machine learning model. Meanwhile, the memory 190 may store the identification information of the user terminal device for identifying the user. For example, the memory 190 may be implemented as a ROM, a RAM, an HDD, an SSD, a memory card, or the like.

The air conditioner 100 may include all of the constituent elements described above or may include some of them. In addition, the air conditioner 100 may further include other constituent elements which perform various functions, in addition to the constituent elements described above.

Figure 4:
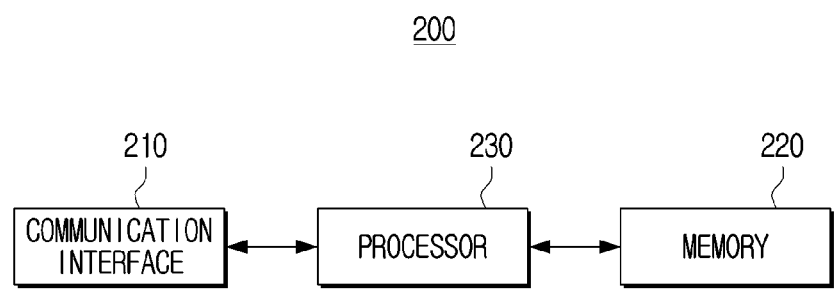
FIG. 4 is a block diagram illustrating a configuration of a server according to an embodiment.

FIG. 4 is a block diagram illustrating a configuration of the server according to an embodiment.

Referring to FIG. 4, the server 200 may include a communication interface 210, a memory 220, and a processor 230.

The communication interface 210 may transmit and receive data (or information) with the air conditioner. The communication interface 210 may receive the setting values of the user, the changed setting values, the environment information when changing the setting values, the environment information when selecting the AI control method, and the like from the air conditioner. In addition, the communication interface 210 may receive the environment information such as the weather from an external server. If the AI cloud which is a separate device from the server 200 includes the machine learning model, the communication interface 210 may transmit the information received from the air conditioner to the AI cloud according to the control of the processor 230, and receive the main setting pattern or the sub-setting pattern. The communication interface 210 may transmit the main setting pattern or the sub-setting pattern to the air conditioner. The communication interface 210 may be referred to as a communicator, a communication module, a transceiver, or the like.

The memory 220 may store data or the like for performing the function of the server 200 and store a program, an instruction, or the like operated in the server 200. Meanwhile, the memory 220 may store information such as environment information, recent setting pattern information of the user, a feedback history (e.g., change of setting values) of the user, and the like. If the server 200 includes the machine learning model, the memory 220 may store a trained machine learning model or an updated machine learning model. The memory 220 may store the generated main setting pattern and sub-setting pattern. For example, the memory 220 may be implemented as a type of a ROM, a RAM, an HDD, an SSD, a memory card, and the like.

The processor 230 may control each constituent element of the server 200. For example, the processor 230 may control the communication interface 210 to transmit and receive data with the air conditioner and an external device (e.g., AI cloud or external server). The processor 230 may receive the setting values set by the user and the environment information via the communication interface 210. The processor 230 may train the machine learning model based on the received setting values (or along with the environment information) by using the AI cloud. The processor 230 may generate the main setting pattern based on the trained machine learning model.

In addition, when the setting values are changed, the processor 230 may receive the changed setting values and the environment information at the time when the setting values are changed from the air conditioner via the communication interface 210. The processor 230 may generate the sub-setting pattern based on the received changed setting values, and the first environment information at the time when the setting values are changed by using the machine learning model. In an embodiment, the processor 230 may generate the sub-setting pattern by applying weights to information such as a room temperature, a time, or a time during which the air conditioning operation is performed among the environment information.

When the AI control method is selected after generating the sub-setting pattern, the processor 230 may receive the second environment information at the time when the AI control method is selected via the communication interface 210. The processor 230 may calculate the similarity based on the first environment information and the second environment information by using the machine learning model. If the calculated similarity is equal to or more than a predetermined value, the processor 230 may transmit the sub-setting pattern, and if the calculated similarity is less than the predetermined value, the processor 230 may control the communication interface 210 to transmit the main setting pattern to the air conditioner.

The function related to the artificial intelligence according to the disclosure may be operated through the processor 230 and the memory 220. In an embodiment, the processor 220 may be configured with one or a plurality of processors. The one or the plurality of processors may be a general-purpose processor such as a CPU, an AP, a digital signal processor (DSP), or the like, a graphic dedicated processor such as a GPU, a vision processing unit (VPU), or the like, or an artificial intelligence dedicated processor such as an NPU, or the like. The one or the plurality of processors may perform control to process the input data according to a predefined action rule stored in the memory 220 or a machine learning model. Alternatively, when the one or the plurality of processors are the artificial intelligence dedicated processors (or associated AI cloud), the artificial intelligence dedicated processors are designed with a hardware structure specialized in processing a specific machine learning model.

The predefined action rule or the machine learning model is formed through training. Being formed through training herein may, for example, imply that a predefined action rule or a machine learning model set to perform a desired feature (or object) is formed by training a basic machine learning model by a learning algorithm by using a plurality of pieces of learning data. Such training may be performed in a device demonstrating artificial intelligence according to the disclosure or performed through a separate server and/or system. Examples of the learning algorithm include supervised learning, unsupervised learning, semi-supervised learning, or reinforcement learning, but the learning algorithm is not limited to the above examples.

The machine learning model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process. The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), or deep Q-network, but there is no limitation to these examples.

Meanwhile, the server 200 may further include other constituent elements other than the constituent elements described above.

Hereinabove, the configurations of the air conditioner and the server 200 configuring the air conditioning system have been described. Hereinafter, the operations of the air conditioning system will be described.

Figure 5:
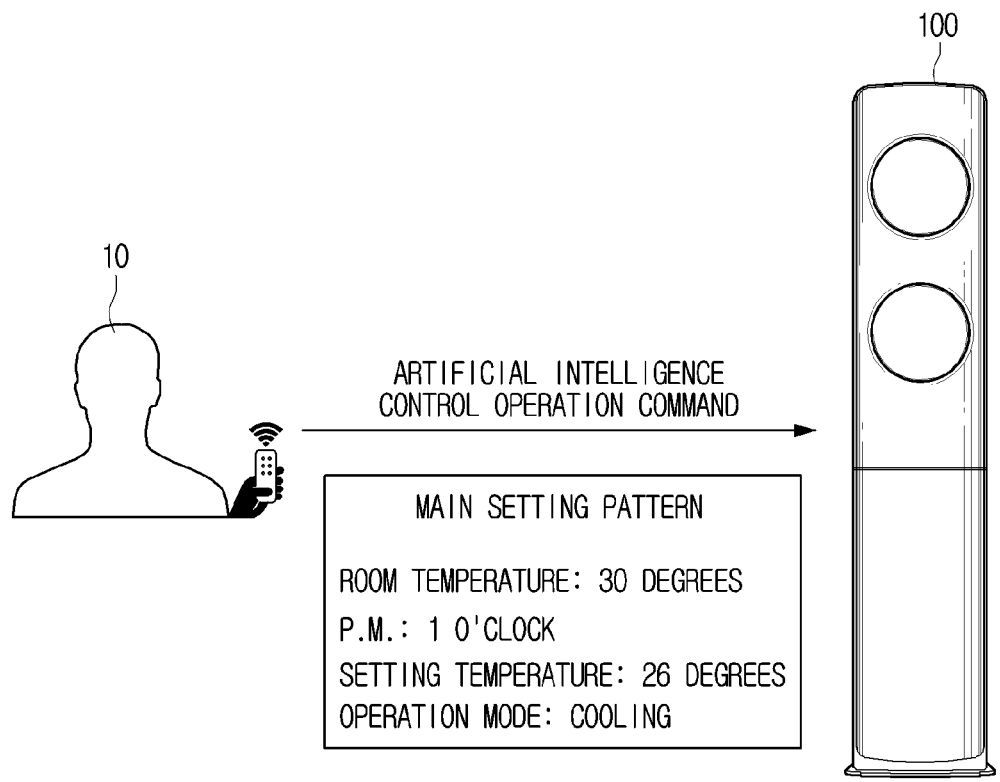
FIG. 5 is a diagram illustrating an operation of the air conditioner according to an embodiment.

FIG. 5 is a diagram illustrating an operation of the air conditioner according to an embodiment.

In an embodiment, the air conditioner 100 may operate by the manual control method or the AI control method. The AI control method is a method for training a machine learning model based on setting values input by a user 10 and environment information, and operating the air conditioner 100 in a main setting pattern generated from the trained machine learning model. For example, the setting values may include an operation mode (e.g., cooling mode, dehumidification mode, or the like), a setting temperature, a setting time, a wind volume, a wind direction, a wind speed, and the like. The environment information may include a room temperature, humidity, weather, date, day, time, an amount of operations, an operation time for one operation, a present state of a user 10, information of a user 10 located in a room, and the like.

When the air conditioner 100 is initially operating by the AI control method initially, no setting values have been input by the user 10. Accordingly, the air conditioner 100 that operates by the AI control method initially may operate in a standard main setting pattern. The standard main setting pattern may refer to a setting pattern generated by a machine learning model trained based on setting values input by a plurality of existing users and corresponding environment information.

As time elapses, the air conditioner 100 may receive various setting values from the user 10. The air conditioner 100 may obtain the environment information at the time when the setting values are input from the user 10. The air conditioner 100 may transmit the input setting values and the environment information to the server 200. The server 200 may receive the input setting values and the environment information from the air conditioner 100. As time elapses, the setting values and the environment information received by the server 200 may be accumulated. The server 200 may train the machine learning model based on the accumulated setting values and environment information, and generate the main setting pattern from the trained machine learning model.

Referring to FIG. 5, after the main setting pattern is generated, the user 10 may operate the air conditioner 100 by the AI control method. The air conditioner 100 may receive the main setting pattern from the server 200. In an embodiment, the main setting pattern may include information such as a room temperature of 30 degrees, 1 p.m., a setting temperature of 26 degrees, a cooling mode, and the like. Accordingly, when an operation command is received by the AI control method, the air conditioner 100 may set a target temperature (setting temperature) to 26 degrees and operate in the cooling mode, when the room temperature is 30 degrees at 1 p.m., based on the received main setting pattern. In other words, the air conditioner 100 may operate by the AI control method according to the received main setting pattern. However, the user 10 may change the target temperature.

Figure 6:
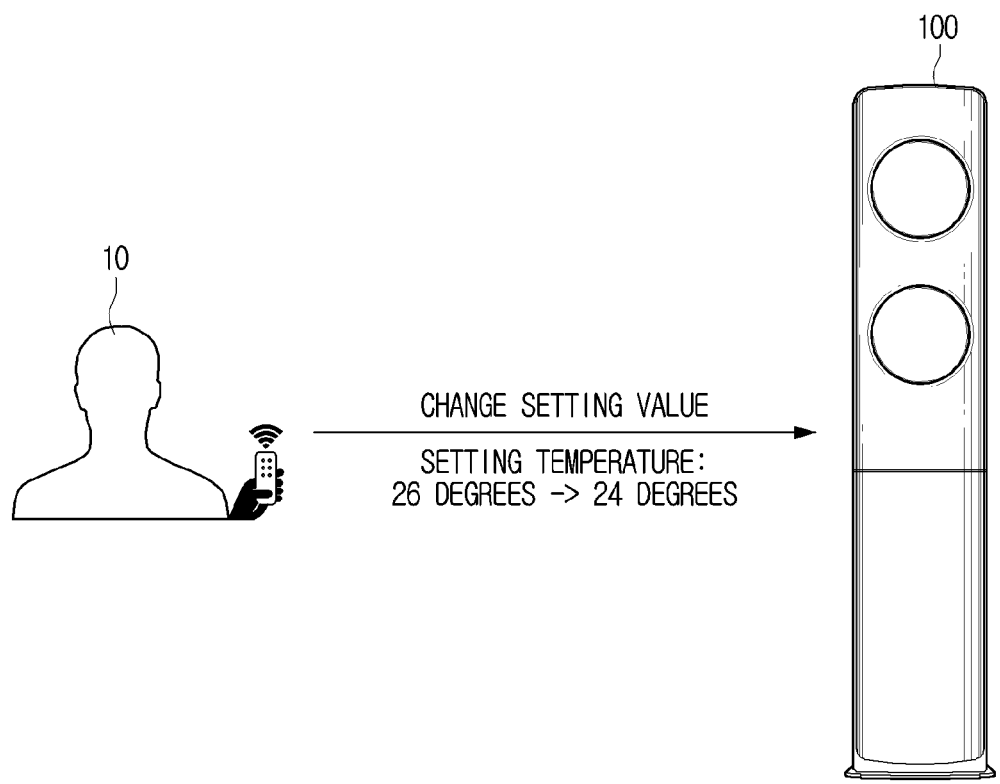
FIG. 6 is a diagram illustrating a setting change operation by a user according to an embodiment.

FIG. 6 is a diagram illustrating a setting change operation by a user 10 according to an embodiment.

Referring to FIG. 6, in an embodiment, the user 10 may change the setting temperature of the air conditioner 100 which operates by the AI control method from 26 degrees to 24 degrees.

As described above, the machine learning model may learn the setting values input by the user 10 and corresponding environment information, and generate the main setting pattern based on the learning result. Accordingly, when the input setting values or the corresponding environment information are changed, the setting values of the main setting pattern generated by the machine learning model may be changed. However, it is necessary that the machine learning model generates the most suitable main setting pattern. Accordingly, very few data or data beyond a certain range is substantially not reflected to the learning result. In addition, the setting values of the main setting pattern may be changed only when data is accumulated certain number of times, and accordingly, the air conditioner 100 (or air conditioning system) may not rapidly respond to the change (feedback) of the setting values of the user 10.

In the disclosure, the air conditioner 100 may operate in the sub-setting pattern separate from the main setting pattern so as to rapidly respond to the change of the setting values of the user 10.

FIG. 7 is a diagram illustrating a setting pattern according to an embodiment.

Referring to FIG. 7, an example of the main setting pattern and the sub-setting pattern is illustrated. The server 200 may train the machine learning model by using the accumulated setting values of the user 10 and the corresponding environment information, and generate the main setting pattern from the trained machine learning model. In an embodiment, the main setting pattern may include information such as a room temperature of 30 degrees, 1 p.m., a setting temperature of 26 degrees, a cooling mode, and the like.

Referring to FIG. 6, the user 10 may change the setting temperature of the air conditioner 100, which operates by the main setting pattern, to 24 degrees. The air conditioner 100 may transmit the changed setting values and the first environment information at the time when the setting values are changed to the server 200. When the changed setting values and the corresponding first environment information are received, the server 200 may record the history controlled by the user 10 by the AI control method.

The server 200 may train the machine learning model by applying weights to predetermined information among the first environment information. For example, the predetermined information to which the weights are applied may include the room temperature, the time, the time during which the air conditioning operation is performed, and the like. The server 200 may generate the sub-setting pattern from the machine learning model which has learned the changed setting values. For example, the sub-setting pattern may include information such as a room temperature of 30 degrees, 1 p.m., a setting temperature of 24 degrees, a cooling mode, and the like. The server 200 may store the main setting pattern and the sub-setting pattern.

Figure 8:
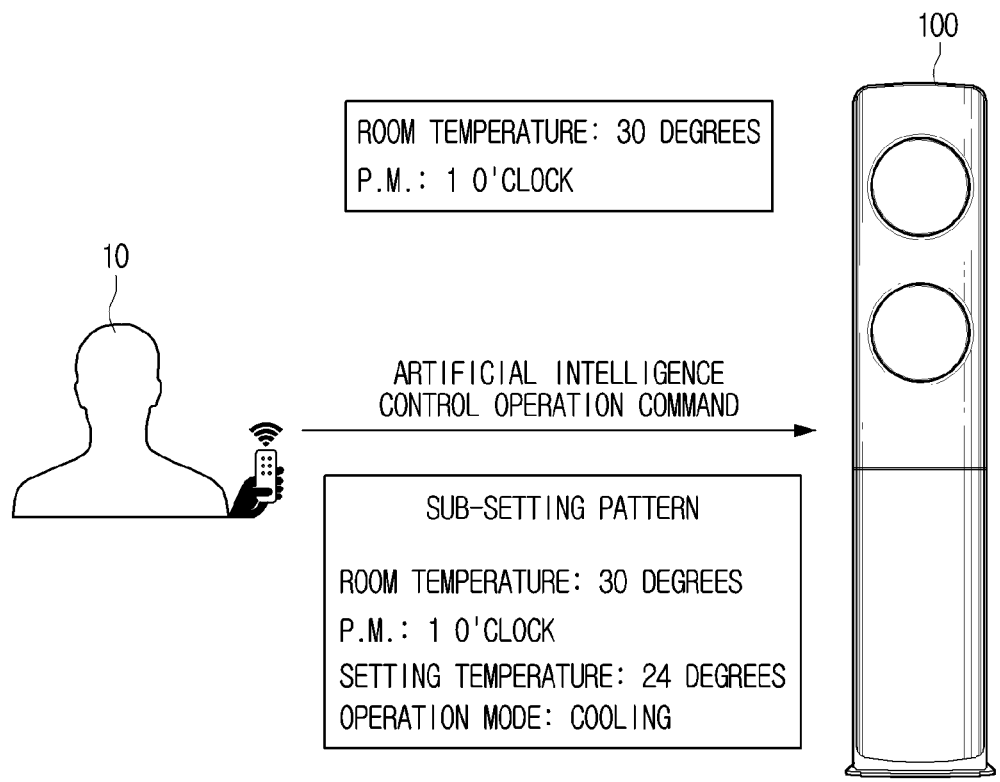
FIG. 8 is a diagram illustrating a feedback control operation according to an embodiment.

FIG. 8 is a diagram illustrating a feedback control operation according to an embodiment.

FIG. 8 illustrates a diagram in which the user 10 controls the air conditioner 100 by the AI control method. After the sub-setting pattern is generated, the user 10 may operate the air conditioner 100 by the AI control method. The server 200 may store both the main setting pattern and the sub-setting pattern.

When the AI control method is selected, the air conditioner 100 may request the setting pattern according to the AI control method from the server 200. In addition, the air conditioner 100 may transmit the second environment information (current environment information) at the time when the AI control method is selected to the server 200. When the setting pattern request and the second environment information are received from the air conditioner 100, the server 200 may compare the second environment information with the first environment information of the generated sub-setting pattern by using the machine learning model. In other words, the server 200 may calculate the similarity between the second environment information and the first environment information of the sub-setting pattern. If the similarity is equal to or more than a predetermined value, the second environment information (current environment information) may be an environment similar to the environment at the time when the setting values are changed by the user 10. If the similarity is less than the predetermined value, the second environment information may be an environment different from the environment at the time when the setting values are changed by the user 10. Accordingly, if the similarity is equal to or more than the predetermined value, the server 200 may transmit the sub-setting pattern to the air conditioner 100, and if the similarity is less than the predetermined value, the server 200 may transmit the main setting pattern to the air conditioner 100. In other words, referring to FIG. 8, in an embodiment, if the similarity is equal to or more than the predetermined value, the sub-setting pattern transmitted to the air conditioner 100 may include information such as a room temperature of 30 degrees, 1 p.m., a setting temperature of 24 degrees, a cooling mode, and the like. The air conditioner 100 may perform an operation based on the received setting pattern.

Meanwhile, the sub-setting pattern may be generated each time when the user 10 changes the setting values. In addition, although the user 10 changes the same setting item to the same value, if the environment information is different, the server 200 may generate separate sub-setting pattern according to the difference in environment information. Accordingly, a plurality of sub-setting patterns may be generated even for one user. In addition, the sub-setting pattern may be generated individually according to the user 10.

FIG. 9 is a diagram illustrating setting patterns according to users according to an embodiment.

Referring to FIG. 9, a main setting pattern, a first sub-setting pattern for husband, and a second sub-setting pattern for wife are illustrated. First, a process of identifying the user 10 by the air conditioner will be described.

The air conditioner 100 may include a camera, a microphone, a biometric information recognition sensor (e.g., fingerprint sensor or iris recognition sensor), and the like. The air conditioner 100 may register identification information for an initial user by using devices included therein. For example, when the air conditioner 100 includes the camera, information on appearance (e.g., face) of the user 10 included in the captured image may be user identification information. When the air conditioner 100 includes the microphone, information on characteristics of the input voice may be the user identification information. When the air conditioner 100 includes the biometric information recognition sensor, the input biometric information may be the user identification information.

The air conditioner 100 may register identification information of the user terminal device of each user. The air conditioner 100 may store the identification information of each user in the memory.

The air conditioner 100 may confirm the user 10 located in the room. For example, when a first user 10 changes the setting values through the camera, the microphone, the biometric information recognition sensor, and the like, the air conditioner 100 may confirm that the first user 10 is located in the room. When the air conditioner 100 stores the identification information of the terminal device of the user 10, the air conditioner 100 may receive the identification information and the location information from all of registered user terminal devices. The air conditioner 100 may confirm the user 10 is present in the room based on the received identification information and location information. In an embodiment, the air conditioner 100 may store the identification information of first to third user terminal devices. The first user 10 may change the setting values of the air conditioner 100. The air conditioner 100 may receive the identification information and the location information from each of the first to third user terminal devices. The location information of the first and second users may indicate the room, and the location information of the third user may indicate the outside. The air conditioner 100 may confirm that first and second users are located in the room based on the received identification information and location information.

The air conditioner 100 may confirm the user 10 is present in the room by receiving the information from the IoT device installed in the house. In an embodiment, the door lock including a biometric information recognition sensor may be installed. The air conditioner 100 may receive the information of the user 10 who entered the room from the door lock. The air conditioner 100 may confirm the user 10 is located in the room based on the information of the user 10 received from the door lock.

The first user 10 may change the setting values of the air conditioner 100. When the IoT device including the camera is located in the house, the air conditioner 100 may receive an image from the IoT device including the camera. The air conditioner 100 may confirm the user 10 is present in the room based on the received image. Another user may operate the IoT device, immediately before the first user 10 changes the setting values of the air conditioner 100 or before a certain period of time from that. The air conditioner 100 may receive information on the user 10 who operated the IoT device from the IoT device which is performing the operation. Accordingly, the air conditioner 100 may confirm the user 10 is present in the room based on the information on the user 10 received from the IoT device which is performing the operation.

When the setting values are changed by the first user 10 during the operation by the AI control method, the air conditioner 100 may transmit the changed setting values, first user information, and environment information at the time when the setting values are changed to the server 200. The server 200 may generate a first sub-setting pattern for the first user 10 by using the machine learning model. In the similar manner, when the setting values are changed by the second user 20 during the operation by the AI control method, the air conditioner 100 may transmit the changed setting values, second user information, and environment information at the time when the setting values are changed to the server 200. The server 200 may generate a second sub-setting pattern for the second user 20 by using the machine learning model.

In addition, the sub-setting pattern may be generated by considering whether the user 10 is present in the room. For example, if the second user is in the room with the first user 10 when the first user 10 changes the setting values, the sub-setting patterns for the first user 10 and the second user 20 may be generated.

Figure 10:
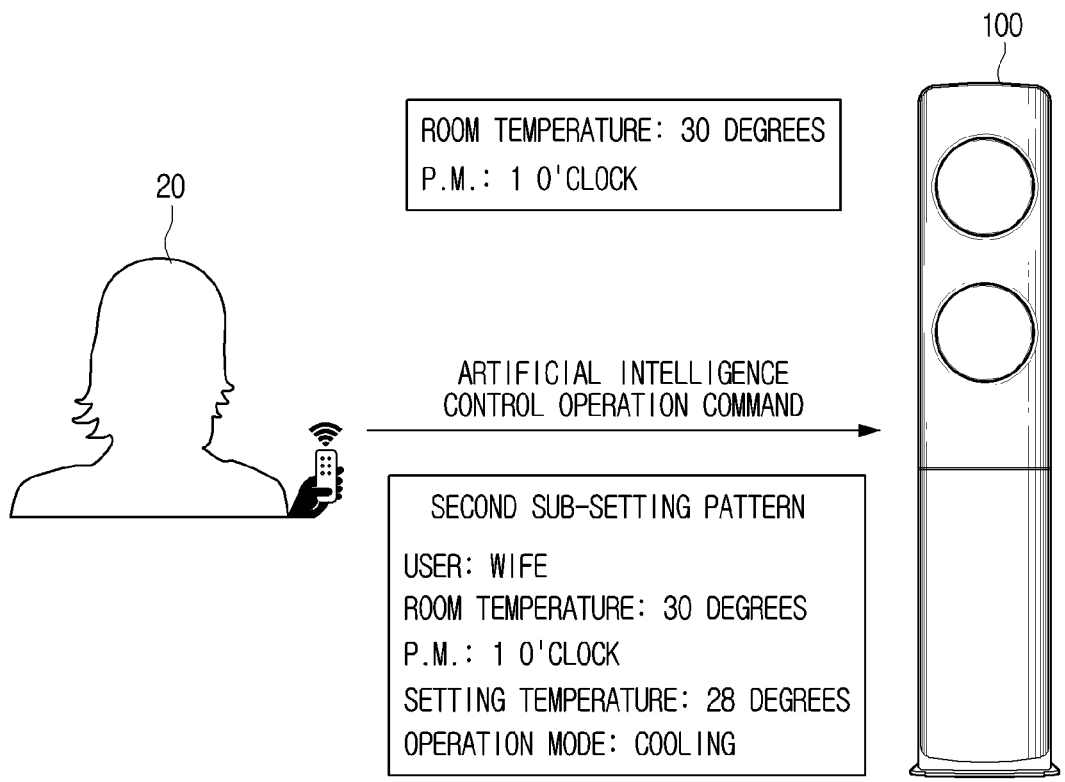
FIG. 10 is a diagram illustrating a feedback control operation according to a user according to an embodiment.

FIG. 10 is a diagram illustrating a feedback control operation according to a user according to an embodiment.

FIG. 10 illustrates a diagram in which a second user 20 controls the air conditioner 100 by the AI control method. After the sub-setting pattern according to the user 10 is generated, the second user 20 may operate the air conditioner 100 by the AI control method. Referring to FIG. 9, the server 200 may store the main setting pattern, the first sub-setting pattern, and the second sub-setting pattern.

When the AI control method is selected, the air conditioner 100 may request the server 200 for the setting pattern according to the AI control method. In addition, the air conditioner 100 may transmit the second environment information at the time when the AI control method is selected (current environment information), and the second user information to the server 200. When the setting pattern request, the second user information, and the second environment information are received from the air conditioner 100, the server 200 may compare the second environment information with the first environment information of the generated second sub-setting pattern related to the second user 20 by using the machine learning model. The server 200 may calculate the similarity between the received second environment information and the first environment information of the second sub-setting pattern. If the similarity is equal to or more than a predetermined value, the second environment information (current environment information) may be an environment similar to the environment when the setting values are changed by the second user 20. Accordingly, if the similarity is equal to or more than the predetermined value, the server 200 may transmit the second sub-setting pattern to the air conditioner 100, and if the similarity is less than the predetermined value, the server 200 may transmit the main setting pattern to the air conditioner 100. In other words, referring to FIG. 10, in an embodiment, the sub-setting pattern transmitted to the air conditioner 100, when the similarity is equal to or more than the predetermined value, may include information such as a room temperature of 30 degrees, 1 p.m., a setting temperature of 28 degrees, a cooling mode, and the like. The air conditioner 100 may perform the operation based on the received setting pattern.

Hereinabove, various embodiments of the air conditioner have been described. Hereinafter, a control process of the air conditioner will be described.

Figure 11:
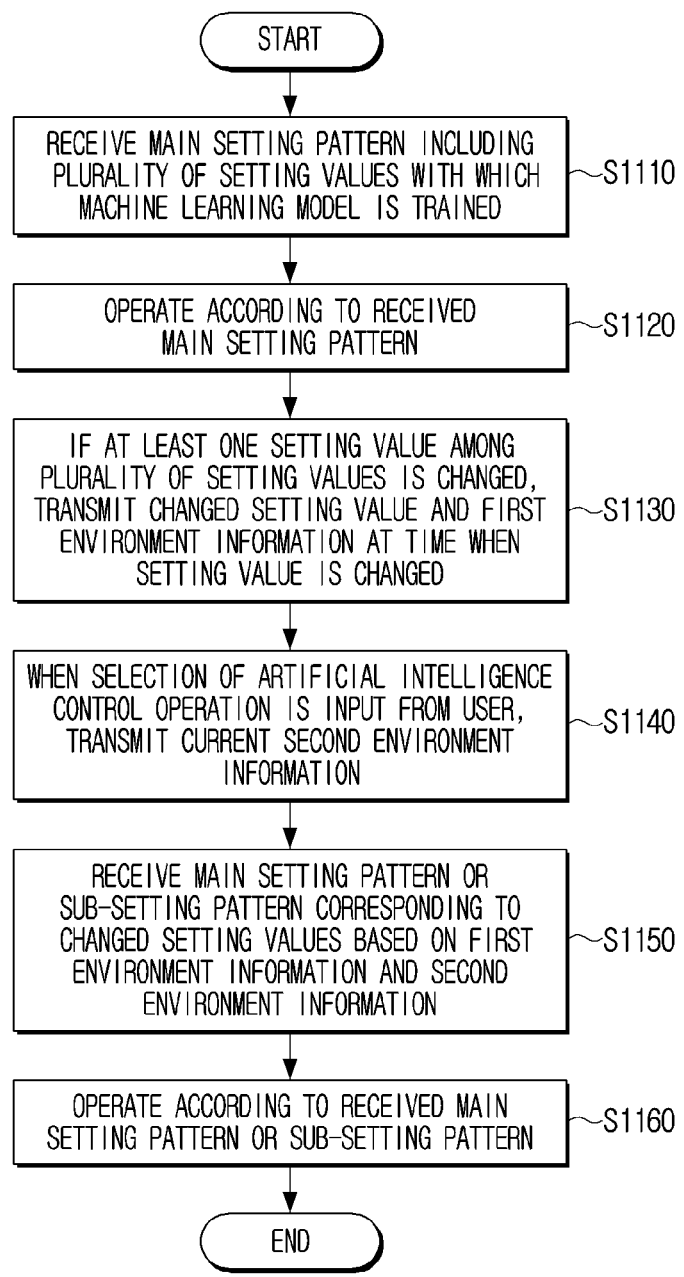
FIG. 11 is a flowchart illustrating a control process of the air conditioner according to an embodiment.

FIG. 11 is a flowchart illustrating a control process of the air conditioner according to an embodiment.

Referring to FIG. 11, the air conditioner 100 may receive a main setting pattern including a plurality of setting values with which a machine learning model is trained (S1110). For example, the server 200 may be associated with the AI cloud. The server 200 may train the machine learning model by using the setting values of the user 10 and corresponding environment information, and generate a main setting pattern from the trained machine learning model. For example, the setting values may include an operation mode (e.g., cooling mode, dehumidification mode, or the like), a setting temperature, a setting time, a wind volume, a wind direction, a wind speed, and the like. The environment information may include a room temperature, humidity, weather, date, day, time, a number of times of operation, an operation time during one operation, a present state of a user 10, information of a user 10 located in a room, and the like. The server may train the machine learning model by applying weights to information such as a room temperature, a time during which an air conditioning operation is performed, a manipulation time, and the like to generate the main setting pattern. The server 200 may transmit the generated main setting pattern to the air conditioner 100. The air conditioner 100 may operate according to the received main setting pattern (S1120). In an embodiment, the machine learning model may be included in the air conditioner 100. In this case, the air conditioner 100 may train the machine learning model and generate the main setting pattern. In addition, the air conditioner 100 may operate according to the generated main setting pattern.

If at least one setting value among the plurality of setting values is changed, the air conditioner 100 may transmit the changed setting value and first environment information at the time when the setting value is changed (S1130). The user 10 may change the setting values of the air conditioner 100 which operates by the AI control method. In other words, the air conditioner 100 may receive a command for changing the setting values from the user 10 while operating based on the main setting pattern. Depending on the case, the first environment information transmitted by the air conditioner 100 may include user information and information indicating whether the user 10 is present in the room.

The server 200 may train the machine learning model by using the setting values of the user 10 and the first environment information, and generate a sub-setting pattern from the trained machine learning model. The server 200 may train the machine learning model by applying weights to the information such as a room temperature, a time during which an air conditioning operation is performed, a manipulation time, and the like to generate the sub-setting pattern. The sub-setting pattern may be generated collectively according to the environment information. The sub-setting pattern may be generated separately according to the user 10 (or according to the information indicating whether the user 10 is present in the room).

In an embodiment, if the machine learning model is included in the air conditioner 100, the air conditioner 100 may train the machine learning model based on the changed setting values and the first environment information, and generate the sub-setting pattern from the trained machine learning model.

When selection of the operation based on the AI control method is input from the user 10, the air conditioner 100 may transmit current second environment information (S1140). The air conditioner 100 may receive the main setting pattern or the sub-setting pattern corresponding to the changed setting values based on the first environment information and the second environment information (S1150). The server 200 may calculate the similarity between the received second environment information with the first environment information. If the similarity is equal to or more than a predetermined value, the second environment information (environment information when the operation based on the AI control method is selected) may be an environment similar to the environment at the time when the setting values are changed by the user 10. If the similarity is less than the predetermined value, the second environment information may be an different environment from the first environment information at the time when the setting values are changed by the user 10. Therefore, if the similarity is equal to or more than the predetermined value, the server 200 may transmit the sub-setting pattern to the air conditioner 100, and if the similarity is less than the predetermined value, the server 200 may transmit the main setting pattern to the air conditioner 100. The air conditioner 100 may operate according to the received main setting pattern or sub-setting pattern (S1160).

In an embodiment, if the machine learning model is included in the air conditioner 100, the air conditioner 100 may obtain the current second environment information according to selection of the AI control method by the user 10. The air conditioner 100 may calculate the similarity based on the first environment information and the second environment information. In addition, the air conditioner 100 may perform an operation in one setting pattern among the main setting pattern or the sub-setting pattern based on the calculated similarity.

Figure 12:
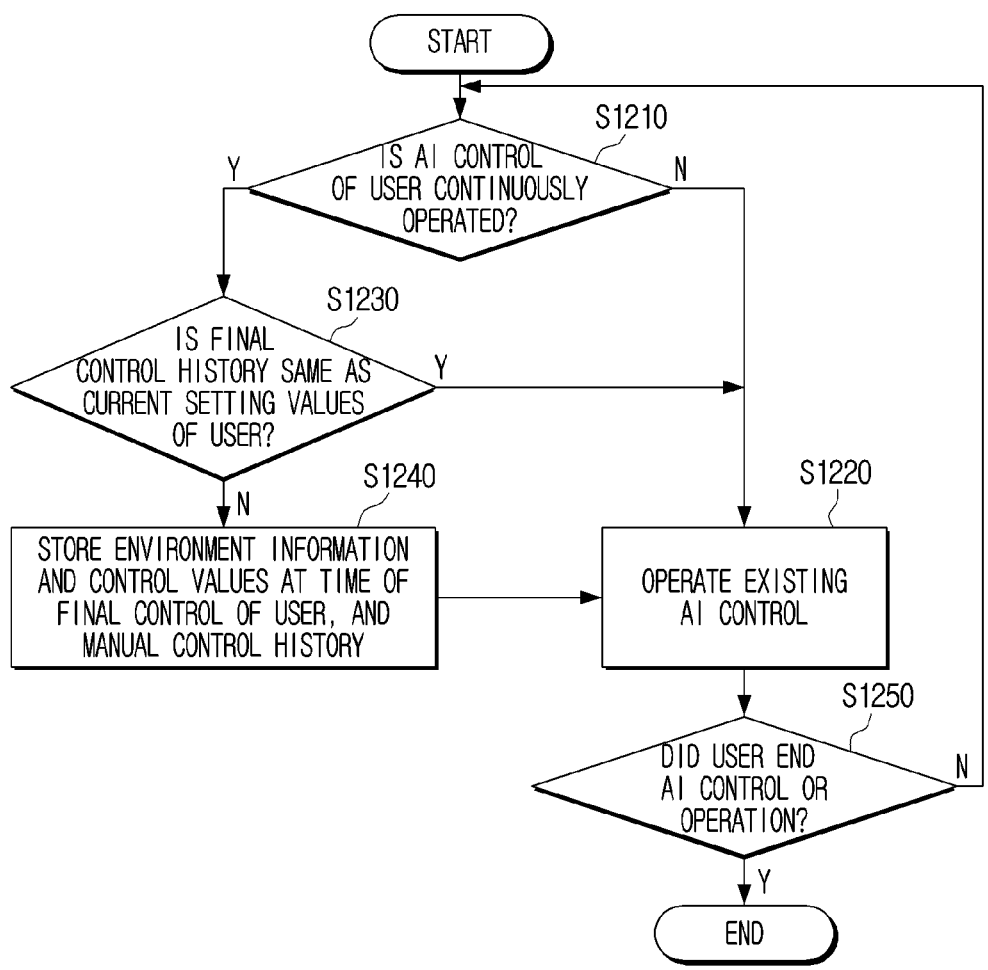
FIG. 12 is a flowchart illustrating a process of obtaining information according to a feedback of a user according to an embodiment.

FIG. 12 is a flowchart illustrating a process of obtaining information according to a feedback of a user 10 according to an embodiment.

The air conditioner 100 may receive selection of the AI control method from the user 10. The air conditioner 100 may confirm whether it is operating by the AI operation method (S1210). If the air conditioner 100 is not operating by the AI operation method (S1210—N), the air conditioner 100 may perform the existing AI control method. For example, the air conditioner 100 may perform the operation based on the main setting pattern (S1220). The air conditioner 100 may confirm whether the user 10 ended the AI control or operation (S1250). If the AI control or the operation does not end (S1250—N), the air conditioner 100 may confirm whether there is a feedback of the user 10.

If the air conditioner 100 is continuously operating by the AI operation method (S1210—Y), the air conditioner 100 may receive a setting value change command. The air conditioner 100 may confirm whether a final control history (e.g., setting values when the air conditioner 100 operated finally) is the same as the current setting values (S1230). If the final control history is the same as the current setting values (S1230—Y), the air conditioner may perform the existing AI control operation (S1220).

If the final control history is not the same as the current setting values (S1230—N), the air conditioner 100 may store environment information and control values (changed values) at the time of the final control of the user 10, and manual control history information (S1240). The air conditioner 100 may perform the existing AI control operation (S1220).

Figure 13:
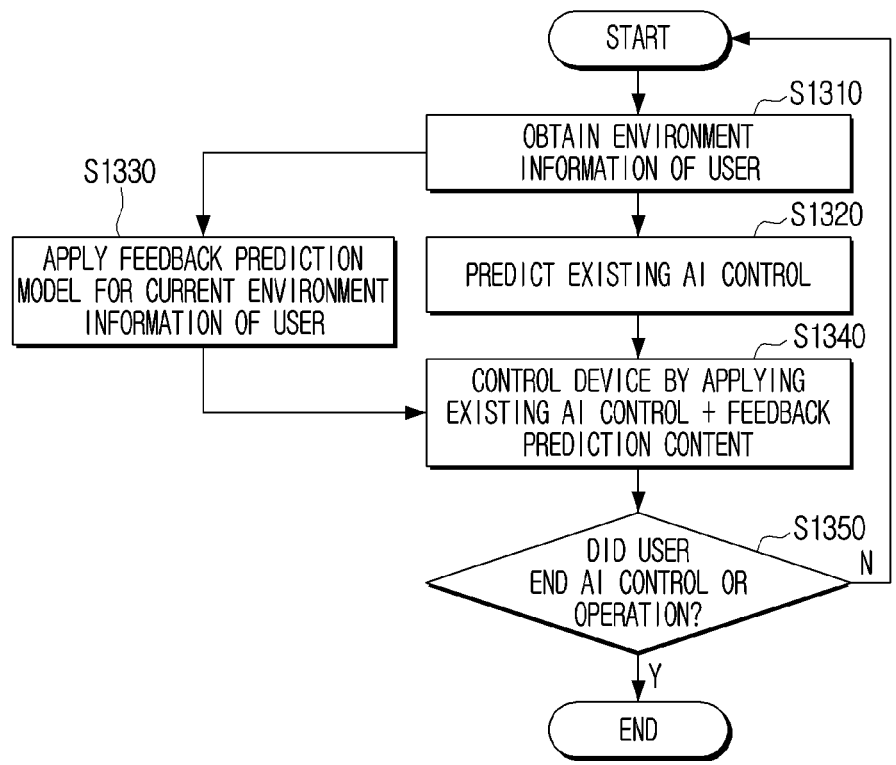
FIG. 13 is a diagram illustrating a control process of the air conditioning system according to an embodiment.

FIG. 13 is a diagram illustrating a control process of the air conditioning system according to an embodiment.

The air conditioner 100 may obtain environment information of the user 10 (S1310). For example, the environment information of the user 10 may refer to current environment information. The server 200 may predict the existing AI control (S1320). In other words, the server 200 may confirm that the current environment information is different from the environment information of the sub-setting pattern generated by the feedback of the user 10. The server 200 may transmit the main setting pattern to the air conditioner 100.

Meanwhile, the air conditioner 100 may apply a feedback prediction model for the current environment information of the user 10 (S1330). In other words, the server 200 may confirm that the current environment information is similar to the environment information of the sub-setting pattern generated by the feedback of the user 10. The server 200 may transmit the sub-setting pattern to the air conditioner 100.

The air conditioner 100 may perform control by applying the existing AI control or feedback prediction data (S1340). In other words, the air conditioner 100 may control the operation by applying setting values included in the received main setting pattern or setting values included in the received sub-setting pattern.

The air conditioner 100 may confirm whether the user 10 ended the AI control or operation (S1350). If the AI control or the operation does not end (S1350—N), the air conditioner 100 may obtain the current environment information and control the operation in an optimal setting pattern.

Figure 14:
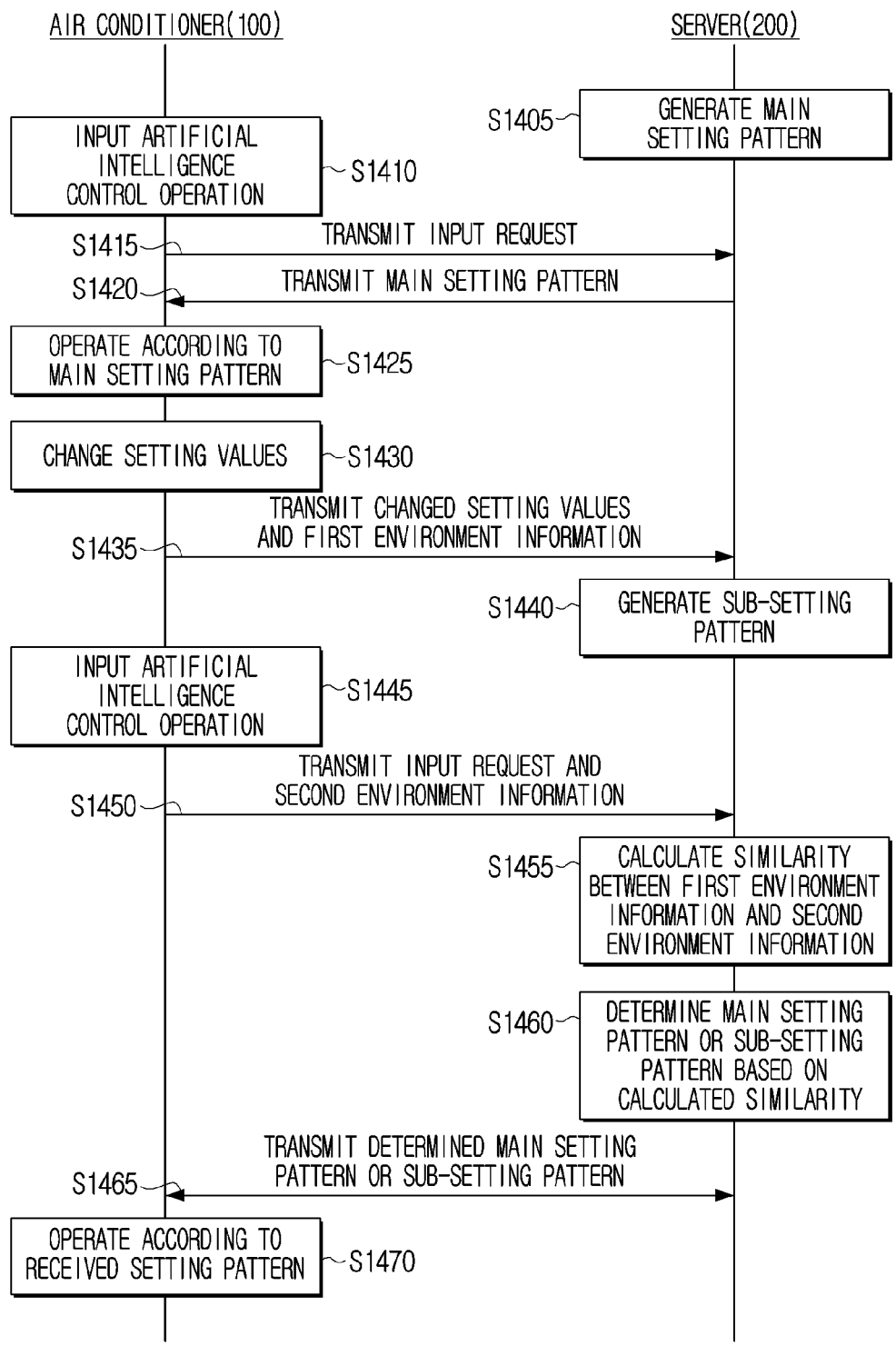
FIG. 14 is a timing diagram illustrating an operation process of the air conditioning system according to an embodiment.

FIG. 14 is a timing diagram illustrating an operation process of the air conditioning system according to an embodiment.

Referring to FIG. 14, the server 200 may generate a main setting pattern (S1405). As described above, the server 200 may generate the main setting pattern based on the setting values input from the user 10 and the corresponding environment information by using the machine learning model. The generated main setting pattern may be stored in the server 200.

The air conditioner 100 may receive an AI control operation (S1410). The user 10 may control the air conditioner 100 to operate by the AI control method. The air conditioner 100 may transmit an input request (S1415). The server 200 may transmit the main setting pattern (S1420). Meanwhile, the air conditioner 100 may obtain environment information at the time when the AI control operation is received. The air conditioner 100 may transmit the obtained environment information. The server 200 may transmit the main setting pattern based on the obtained environment information. The air conditioner 100 may operate according to the main setting pattern (S1425).

The air conditioner 100 may receive a command for changing the setting values (S1430). The air conditioner 100 may transmit the changed setting values and the first environment information (S1435). For example, the first environment information may refer to environment information at the time when the setting values are changed by the user 10. The server 200 may generate a sub-setting pattern (S1440). The sub-setting pattern may be generated individually according to the user 10 or environment information.

The air conditioner 100 may receive the AI control operation (S1445). The user 10 may control the air conditioner 100 to operate by the AI control method. The air conditioner 100 may transmit the input request. The air conditioner 100 may transmit the input request and the second environment information (S1450). For example, the second environment information may refer to environment information at the time when the request is received. The air conditioner 100 may obtain current environment information at every certain time point. The obtained current environment information may be transmitted to the server 200.

The server 200 may calculate a similarity between the first environment information and the second environment information (S1455). The server 200 may determine the main setting pattern or the sub-setting pattern based on the calculated similarity (S1460). If the similarity is equal to or more than the predetermined value, the second environment information (or current environment information) may be an environment similar to the environment at the time when the setting values are changed by the user 10. If the similarity is less than the predetermined value, the second environment information may be an environment different from the environment at the time when the setting values are changed by the user 10.

The server 200 may transmit the determined main setting pattern or sub-setting pattern (S1465). If the similarity is equal to or more than the predetermined value, the server 200 may transmit the sub-setting pattern, and if the similarity is less than the predetermined value, the server 200 may transmit the main setting pattern. The air conditioner 100 may operate according to the received setting pattern (S1470).

The method for controlling the air conditioner 100 according to the various embodiments may be provided as a computer program product. The computer program product may include an S/W program or a non-transitory computer readable medium storing the S/W program.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

The invention claimed is:

1. An air conditioner comprising:
an input interface;
a communication interface configured to communicate with a server; and
a processor configured to:
receive, from the server, a main setting pattern comprising a plurality of setting values, with which a machine learning model is trained,
operate according to the received main setting pattern,
based on a setting value among the plurality of setting values changing via the input interface, transmit, to the server, the changed setting value and first environment information at a time when the setting value is changed;
based on receiving a selection of an artificial intelligence control operation from a user, transmit, to the server, second environment information;
control the communication interface to receive, from the server, the main setting pattern or a sub-setting pattern corresponding to the changed setting value based on the first environment information and the second environment information;
operate according to the received main setting pattern or the received sub-setting pattern;
control the communication interface to, based on a similarity between the first environment information and the second environment information being equal to or more than a predetermined value, receive the sub-setting pattern from the server; and
based on the similarity between the first environment information and the second environment information being less than the predetermined value, receive the main setting pattern from the server.

2. The air conditioner according to claim 1, wherein the sub-setting pattern is generated individually according to a user present in a room through training of the machine learning model based on information indicating whether the user is present in the room.

3. The air conditioner according to claim 2, further comprising:
a memory,
wherein the processor is configured to:
store identification information of a terminal device of the user in the memory,
control the communication interface to, based on the setting value changing, receive identification information and location information of the terminal device,
confirm the user based on the stored identification information and the received identification information,
confirm whether the confirmed user is present in the room based on the received location information, and
control the communication interface to transmit the information indicating whether the confirmed user is present in the room to the server.

4. The air conditioner according to claim 1, wherein the sub-setting pattern is generated by applying a weight to at least one piece of information of a room temperature, a manipulation time, or a time during which an air conditioning operation is performed.

5. The air conditioner according to claim 1, wherein the first environment information and the second environment information comprises at least one of a room temperature, humidity, weather, date, day, time, a number of times of operation, an operation time, a present state of a user, or information on a user located in a room.

6. A method for controlling an air conditioner, the method comprising:
receiving a main setting pattern comprising a plurality of setting values, with which a machine learning model is trained;
operating according to the received main setting pattern;
based on a setting value among the plurality of setting values changing, transmitting the changed setting value and first environment information at a time when the setting value is changed;
based on receiving a selection of an artificial intelligence control operation from a user, transmitting second environment information;
receiving the main setting pattern or a sub-setting pattern corresponding to the changed setting value based on the first environment information and the second environment information;
operating according to the received main setting pattern or the received sub-setting pattern;
control a communication interface to, based on a similarity between the first environment information and the second environment information being equal to or more than a predetermined value, receive the sub-setting pattern from a server; and
based on the similarity between the first environment information and the second environment information being less than the predetermined value, receive the main setting pattern from the server.

7. The method according to claim 6, wherein the sub-setting pattern is generated individually according to a user present in a room through training of the machine learning model based on information indicating whether the user is present in the room.

8. The method according to claim 7, further comprising:
storing identification information of a terminal device of the user;
based on the setting value changing, receiving identification information and location information of the terminal device;
confirming the user based on the stored identification information and the received identification information and confirming whether the confirmed user is present in the room based on the received location information; and
transmitting the information indicating whether the confirmed user is present in the room.

9. The method according to claim 6, wherein the sub-setting pattern is generated by applying a weight to at least one piece of information of a room temperature, a manipulation time, or a time during which an air conditioning operation is performed.

10. The method according to claim 6, wherein the first environment information and the second environment information comprises at least one of a room temperature, humidity, weather, date, day, time, a number of times of operation, an operation time during one operation, a present state of a user, or information on a user located in a room.

11. An air conditioning system comprising an air conditioner and a server, the air conditioning system comprising:
the server configured to transmit a main setting pattern comprising a plurality of setting values, with which a machine learning model is trained, to the air conditioner; and
the air conditioner configured to:
operate according to the main setting pattern received from the server,
based on a setting value among the plurality of setting values changing, transmit the changed setting value and first environment information at a time when the setting value is changed to the server, and
based on receiving a selection of an artificial intelligence control operation from a user, transmit second environment information to the server,
wherein the server is further configured to:
transmit the main setting pattern or a sub-setting pattern corresponding to the changed setting value to the air conditioner based on the first environment information and the second environment information,
based on a similarity between the first environment information and the second environment information being equal to or more than a predetermined value, transmit the sub-setting pattern to the air conditioner, and
based on the similarity being less than the predetermined value, transmit the main setting pattern to the air conditioner, and wherein the air conditioner is further configured to:
  operate according to the main setting pattern or the sub-setting pattern received from the server, and
  generate the sub-setting pattern separate from the main setting pattern through the machine learning model based on the changed setting value and the first environment information received from the air conditioner.

12. The air conditioning system according to claim 11, wherein the server is configured to:
  calculate the similarity between the first environment information and the second environment information.

* * * * *